G. BEVITT.
Corn Sheller.
No. 66,205. Patented July 2, 1867.
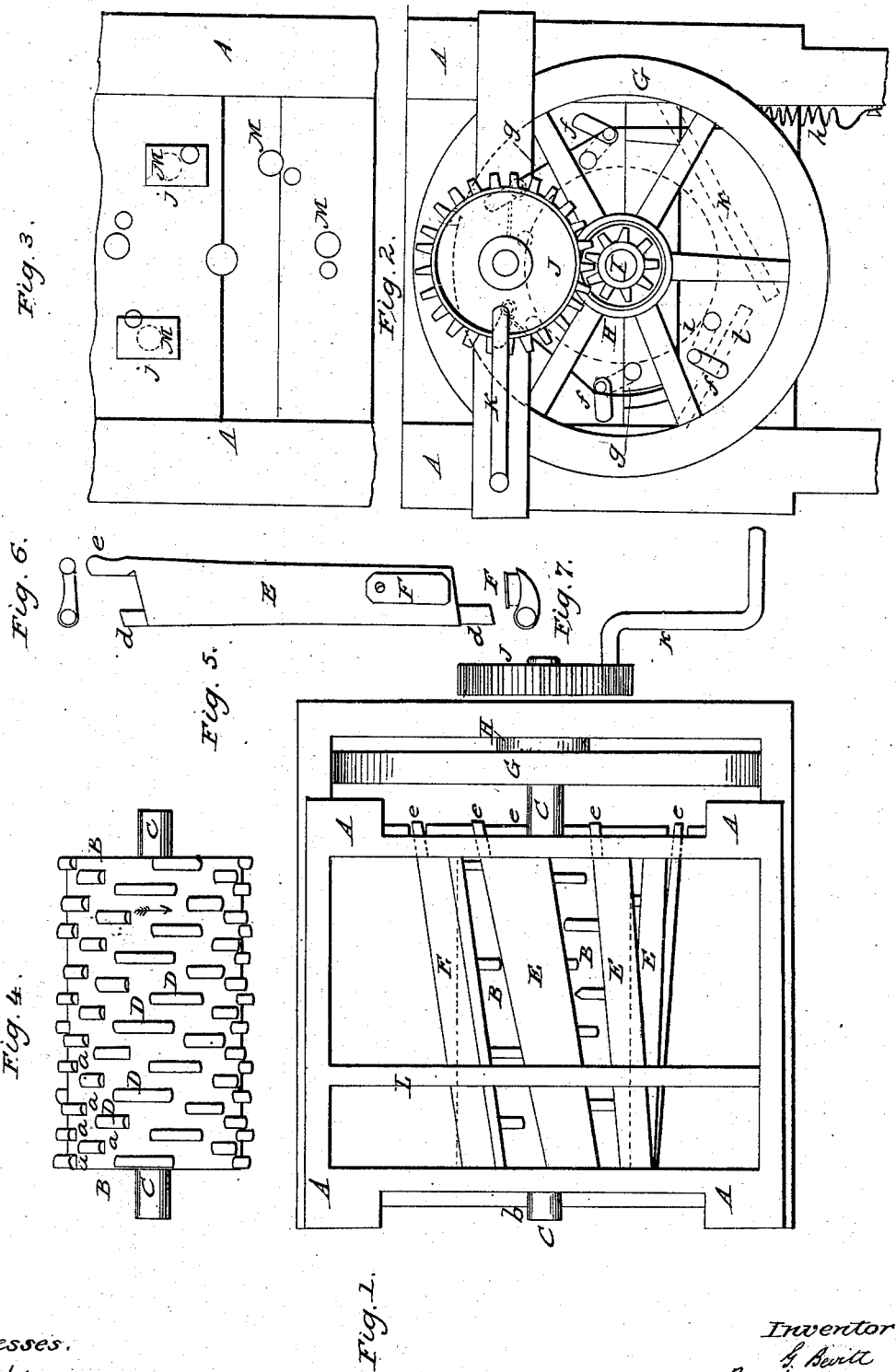
Witnesses.
P. T. Dodge
Geo. H. Grubel
Inventor.
G. Bevitt
By Dodge & Munn his attys.

United States Patent Office.

GEORGE BEVITT, OF MADISON, WISCONSIN, ASSIGNOR TO HIMSELF AND JOHN GEORGE OTT, OF THE SAME PLACE.

*Letters Patent No. 66,205, dated July 2, 1867.*

IMPROVEMENT IN CORN-SHELLERS.

*The Schedule referred to in these Letters Patent and making part of the same.*

TO ALL WHOM IT MAY CONCERN:

Be it known that I, GEORGE BEVITT, of the city of Madison, in the county of Dane, and State of Wisconsin, have invented certain new and useful improvements in Corn-Shellers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in making a new and improved "corn-sheller" by which to secure the rapid and complete shelling of the corn from ears of different sizes. In the drawings—

Figure 1 represents a top plan view.
Figure 2 represents an end view.
Figure 3 represents a view of a portion of the opposite end.
Figure 4 represents a view of the cylinder detached.
Figure 5 represents a view of one of the concave slats detached, and
Figures 6 and 7 represent end views of the concave slat.

In making my corn-sheller I construct a strong frame, A, supporting it by uprights when necessary. Within the frame A I mount a cast cylinder, B. This cylinder I provide with hubs and arms and centre-shaft C extending beyond its ends, and cover its surface with oblong teeth D. One end of these teeth I make flush with the surface of the cylinder, and then, extending them upward and forward on the surface, terminate them in a line at right angles with a cross-section of the cylinder, as shown in fig. 4 at $a$. The cylinder B, with its hubs and arms and centre-shaft C, and oblong teeth D, may all be made of one casting. After mounting the cylinder B within the frame A on its bearings at $b$ $c$, I surround it with a series of concave slats, E, placed obliquely across its surface, and at a sufficient distance from it to allow ears of corn to pass between them and the cylinder when in the process of being shelled. These concave slats E I provide with a journal, $d$, at either end to hold them in their place in the frame A. I also provide one of their ends with a projection, $e$, as shown in fig. 5. These projections $e$ enter a slot, $f$, in the frame A. The length of the slot $f$ limits and provides for the motion of the concave slats E on their bearings $d$. The projection $e$ of the concave slats I make sufficiently long to pass through and extend beyond the side of the frame A, as shown in fig. 2, and then I pass a cord or wire, $g$, over these projecting ends, fastening one end at $i$, and attaching the other end to a spiral or other spring, $h$, as shown in fig. 2. By this arrangement the concave slats are made to hug the cylinder more closely when necessary. The concave slats I make a little wider at their feed end, and turn them up a little at that end, so as to allow the corn to pass under them more readily, and near their opposite ends, on the concave side, attach a thin, flat spring, F, as shown in fig. 5. The end views of the concave slats E are shown in figs. 6 and 7. Opposite the delivery or narrow ends of the concave slats E, when placed in position, I make openings or holes in the frame A, as shown in fig. 3 at M, through which the cobs pass out after the corn is shelled off, and place leather flaps $j$ over them. These flaps yield easily to the pressure of the cobs and fly back to their places after the cobs pass out. I extend the frame A on the crank-side, so as to introduce the fly-wheel G and the driving-pulley H and pinion-wheel I on to the shaft C of the cylinder B, and as a bearing for the cog-wheel J, which gears into the pinion I, and also receives the crank K, as shown in figs. 1 and 2. The bottom of the frame A is shaped as shown by the dotted lines $k$ $l$ in fig. 2, with an opening to allow the corn to pass out after being shelled. A spout may be hung under the frame A for the corn to pass through, if desirable. The number of concave slats used will depend upon the size of the mill. Ordinarily six of them will answer, and, if desirable, they may be cast with their concave surface corrugated or like a grate. These concaves, as well as being movable, act entirely independent of each other. Into the upper part of the frame A I place a partition, L, so as to cut off about one-third of the length of the cylinder, in order that the corn may be thrown upon and be received at the feed end of the movable concave slats. The third part thus partitioned off may be covered.

In operating my corn-sheller I turn the crank K, or apply my power by means of a belt to the pulley-wheel H, and thus cause the cylinder B to revolve rapidly. I then throw the corn with a scoop-shovel or other convenient device into the hopper. It is caught under the flaring or upturned ends of the movable concave slats E. It passes along obliquely between the concaves E and the teethed cylinder B. The corn is shelled rapidly off of the cob and passes down through the under side of the mill. The cobs are impelled to the opposite ends of the concaves E and pass out through the holes F. Ordinarily the concaves will hug the cylinder sufficiently close with their own weight, and at the same time adapt themselves to the different sizes of the cobs to insure perfect shelling. But when this is not the case, such adaptability can be secured by means of the cord or wire $g$ and spring $h$, and if, when the cobs reach the delivery end of the concaves E, there should still be any corn upon them, the flat spring F will press them so close to the cylinder that its teeth will take off the last kernel. The corn may be cleaned at the same time that it is shelled by riveting four pieces of sheet iron within the cylinder and placing them lengthwise, and at the same time a little oblique with the length of the cylinder. These pieces will form a fan, and the wind, by means of a small elbow spout, can be turned on the corn as it passes from the mill. The oblong teeth D, with their square ends $a$, both strengthen the cylinder, and at the same time shell the corn in the easiest and most rapid manner.

Having thus described my invention, what I claim, is—

1. The cylinder B, provided with the oblong inclined teeth D, constructed substantially as described.

2. In combination with the cylinder I claim the concave slats E, when arranged to operate in connection therewith, substantially as described.

3. Providing the concaves E with the spring F, as and for the purpose set forth.

GEORGE BEVITT.

Witnesses:
HENRY WINCKLER,
GEORGE ROCKENBACH.